(12) United States Patent
Watanabe et al.

(10) Patent No.: US 8,960,701 B2
(45) Date of Patent: Feb. 24, 2015

(54) TWO-WHEELED MOTOR VEHICLE AND FRONT FORK FOR THE SAME

(71) Applicants: Honda Motor Co., Ltd., Tokyo (JP); Kayaba Industry Co., Ltd., Tokyo (JP)

(72) Inventors: Akimi Watanabe, Wako (JP); Nobuhiro Noguchi, Tokyo (JP); Satoshi Kamiya, Tokyo (JP)

(73) Assignees: Honda Motor Co., Ltd., Tokyo (JP); Kayabe Industry Co., Ltd., Tokyo (JP)

( * ) Notice: Subject to any disclaimer, the term of this patent is extended or adjusted under 35 U.S.C. 154(b) by 0 days.

(21) Appl. No.: 13/843,487

(22) Filed: Mar. 15, 2013

(65) Prior Publication Data

US 2013/0257012 A1 Oct. 3, 2013

(30) Foreign Application Priority Data

Apr. 2, 2012 (JP) ................. 2012-083523

(51) Int. Cl.
| | |
|---|---|
| *B62K 21/02* | (2006.01) |
| *B62K 25/08* | (2006.01) |
| *B62K 21/04* | (2006.01) |
| *F16F 9/34* | (2006.01) |
| *B62K 25/16* | (2006.01) |
| *F16F 9/516* | (2006.01) |
| *F16F 9/46* | (2006.01) |

(52) U.S. Cl.
CPC ............... *B62K 25/08* (2013.01); *B62K 21/04* (2013.01); *F16F 9/34* (2013.01); *B62K 21/02* (2013.01); *B62K 25/16* (2013.01); *F16F 9/516* (2013.01); *F16F 9/46* (2013.01)
USPC ............................................................ 280/276

(58) Field of Classification Search
CPC ........ B62K 25/08; B62K 25/16; B62K 21/02; B62K 21/18; F16F 9/516; F16F 9/34; F16F 9/46
See application file for complete search history.

(56) References Cited

U.S. PATENT DOCUMENTS

| | | | | |
|---|---|---|---|---|
| 7,708,296 | B2* | 5/2010 | Becker et al. | 280/276 |
| 8,256,787 | B2* | 9/2012 | Inoue et al. | 280/276 |
| 8,573,623 | B2* | 11/2013 | Amano et al. | 280/276 |
| 8,628,103 | B2* | 1/2014 | Kawai et al. | 280/280 |
| 2003/0001358 | A1* | 1/2003 | Becker et al. | 280/276 |
| 2004/0232650 | A1* | 11/2004 | Felsl et al. | 280/283 |
| 2010/0044975 | A1* | 2/2010 | Yablon et al. | 280/5.503 |
| 2010/0295266 | A1* | 11/2010 | Mori et al. | 280/279 |
| 2011/0042915 | A1* | 2/2011 | Felsl et al. | 280/283 |
| 2012/0160054 | A1* | 6/2012 | Kawai et al. | 74/551.1 |
| 2013/0075998 | A1* | 3/2013 | McAndrews et al. | 280/276 |
| 2013/0154233 | A1* | 6/2013 | Amano et al. | 280/276 |

FOREIGN PATENT DOCUMENTS

| | | |
|---|---|---|
| JP | 2011-122699 | 6/2011 |
| WO | WO2012/039396 | * 3/2012 |

* cited by examiner

*Primary Examiner* — Joseph Rocca
*Assistant Examiner* — Marlon Arce
(74) *Attorney, Agent, or Firm* — Rankin, Hill & Clark LLP

(57) ABSTRACT

In a two-wheeled motor vehicle having a pair of right and left front forks for supporting a front wheel so that the front wheel is rotatable, a top bridge for supporting upper ends of the pair of right and left front forks, a handle post provided to the top bridge, and a bar-shaped handle secured to the hand post, the handle is provided above the front forks with respect to an axial line direction of the front forks, each front fork is provided with an air valve for sealingly filling air in the front fork and a projection on the upper surface thereof, and the projection is formed to be higher than the air valve.

6 Claims, 8 Drawing Sheets

TWO-WHEELED MOTOR VEHICLE AND FRONT FORK FOR THE SAME

INCORPORATION BY REFERENCE

The present application claims priority under 35 U.S.C. §119 to Japanese Patent Application No. 2012-083523 filed on Apr. 2, 2012. The content of the application is incorporated herein by reference in its entirety.

BACKGROUND OF THE INVENTION

1. Field of the Invention

The present invention relates to a two-wheeled motor vehicle and a front fork for the same.

2. Description of the Related Art

There is known a two-wheeled motor vehicle provided with an air valve on the upper surface of a front fork thereof to supplement air from the air valve into the front fork (see JP-A-2011-122699, for example). In the two-wheeled motor vehicle disclosed in JP-A-2011-122699, the air valve is threadably fitted (screwed) from an air chamber side in the front fork to a cap blocking the upper surface of the front fork, thereby configuring the two-wheeled motor vehicle so that the air valve does not protrude upwardly, so that external force is prevented from acting on the air valve with suppressing air leakage.

According to the front fork described above, the air valve is embedded in a hole formed in the upper surface of the cap, whereby the external force can be prevented from acting on the air valve. However, it is difficult to detach a valve cap from the air valve by a hand. In addition, soil or the like easily deposits in the hole in which the air valve is embedded. Accordingly, it requires a labor to remove the deposition such as the soil or the like, and thus it takes much time to supplement air into the front fork. Therefore, it has been strongly required to easily supplement air into the front fork while preventing external force from acting on the air valve.

SUMMARY OF THE INVENTION

The present invention has been implemented in view of the foregoing situation, and has an object to enable both prevention of action of external force on an air valve of a front fork and easy supplement of air into the front fork.

In order to attain the above object, according to a first aspect of the presents invention, there is provided a two-wheeled motor vehicle having a pair of right and left front forks for supporting a front wheel so that the front wheel is rotatable, a top bridge for supporting upper ends of the pair of right and left front forks, a handle post provided to the top bridge, and a bar-shaped handle secured to the hand post, wherein the handle is provided above the front forks with respect to an axial line direction of the front forks, each front fork is provided with an air valve for sealingly filling air in the front fork and a projection on the upper surface thereof, and the projection is formed to be higher than the air valve.

According to the present invention, the handle is provided above the front fork with respect to the axial line direction of the front fork, the air valve for sealingly filling air in the front fork and the projection are provided, and the projection is formed to be higher than the air valve (that is, the projection is disposed to be nearer to the handle). Accordingly, when the handle sags (warps) downwards, the handle referentially comes into contact with the projection, so that the handle hardly comes into contact with the air valve. Therefore, external force can be prevented from acting on the air valve through the handle. Furthermore, soil or the like hardly deposits between the projection and the air valve, and also a working space can be secured around the air valve, so that air can be easily supplemented into the front fork.

Furthermore, in the above two-wheeled motor vehicle of the first aspect of the present invention, the air valve is provided with an air valve cap for supporting the air valve from the upper side thereof, and the height of the projection is set to be substantially equal to the height of the air valve cap or higher than the air valve cap.

According to the above two-wheeled motor vehicle, the projection is disposed to be substantially equal to or higher than the air valve cap (e.g., with respect to the axial line direction of the front fork). Therefore, when the handle sags (warps or bows) downwards, the handle can be prevented from coming into direct contact with the air valve cap, and external force can be suppressed from acting on the air valve through the handle. Furthermore, the projection on the upper surface of the front fork hardly disturbs a working (for example, an air filling work or the like), a working space can be secured around the air valve, and the air valve cap can be easily mounted and demounted, so that air can be easily supplemented into the front fork.

Furthermore, in the above two-wheeled motor vehicle of the first aspect of the present invention, the air valve is disposed at the outside of a projection plane obtained by projecting the handle in the axial line direction of the front fork.

According to the above two-wheeled motor vehicle, the air valve is disposed at the outside of the projection plane obtained by projecting the handle in the axial direction of the front fork. Therefore, the handle does not disturb various works required for the air valve, and the working space can be secured above the air valve. Therefore, air can be easily filled into the front fork through the air valve. Furthermore, the handle can be suppressed from coming into contact with the air valve.

Furthermore, in the above two-wheeled motor vehicle of the first aspect of the present invention, the handle post is supported through an elastic member by the top bridge, and a part of the projection is disposed to be overlapped with an axial line of the handle in the axial line direction of the front fork.

According to the above two-wheeled motor vehicle, force which is applied due to landing of the vehicle or the like can be evacuated by elastic support of the handle post. Furthermore, a part of the projection is disposed to be overlapped with the axial line of the handle with respect to the axial line direction of the front fork. Therefore, even when the position of the handle is displaced downwards in the axial line direction of the front fork due to the elastic support, the handle comes into contact with the projection. Therefore, the air valve can be prevented from suffering external force through the handle.

In the above two-wheeled motor vehicle of the first aspect of the present invention, the projection and the air valve are arranged side by side, and a recess portion which is concaved in the opposite direction to the air valve is formed on a surface of the projection which confronts the air valve.

According to the above two-wheeled motor vehicle, the projection and the air valve are arranged side by side, the recess (concave) portion which is concaved (recessed) in the opposite direction to the air valve is formed on the surface of the projection which confronts the air valve. Therefore, the working space can be secured by the recess portion, so that air can be easily supplemented into the front fork.

In the above two-wheeled motor vehicle of the first aspect of the present invention, a cable to be inserted and passed in a front-and-rear direction is routed in a space extending in a vehicle width direction between the handle post and the projection.

According to the two-wheeled motor vehicle, the cable to be inserted and passed in the front-and-rear direction is routed (laid on) in the space extending in the vehicle width direction between the handle post and the projection. Therefore, when the handle sags downwards, the cable can be prevented from being pinched between handle and the projection.

According to a second aspect of the present invention, there is provided a front fork that supports a front wheel of a two-wheeled motor vehicle in which a bar-shaped handle is secured to a top bridge through a handle post and is supported at the upper end thereof by the top bridge, wherein the front fork is provided so that the handle is located above the front fork in an axial line direction of the front fork, an air valve for sealingly filling air in the front fork and a projection are provided on an upper surface of the front fork, and the projection is disposed to be higher than the air valve.

According to the above front fork of the second aspect of the present invention, when the handle sags downwards, the handle first comes into contact with the projection, and thus the handle hardly comes into contact with the air valve. Therefore, an external force can be prevented from acting on the air valve through the handle. Furthermore, soil or the like is difficult to deposit between the projection and the air valve on the upper surface of the front fork, and also the working space can be secured around the air valve, so that air can be easily supplemented into the front fork.

According to the present invention, the projection on the upper surface of the front fork is formed to be higher than the air valve. Therefore, when the handle sags downwards, the handle preferentially comes into contact with the projection, and hardly comes into contact with the air valve. Therefore, external force can be prevented from acting on the air valve through the handle. Furthermore, soil or the like is difficult to deposit between the projection and the air valve on the upper surface of the front fork, and the working space can be secured around the air valve. Therefore, air can be easily supplemented.

Still furthermore, when the handle sags downwards, the handle can be prevented from coming into direct contact with the air valve cap, and external force can be suppressed from acting on the air valve through the handle. Furthermore, the working space can be secured around the air valve, and the air valve cap can be easily mounted and demounted, so that air can be easily supplemented.

The air valve is disposed at the outside of the projection plane obtained by projecting the handle fork in the axial line direction of the front fork. Therefore, the handle does not disturb the work for the air valve, the working space can be secured above the air valve, and air can be easily supplemented into the front fork. Furthermore, it can be made difficult for the handle to come into contact with the air valve.

Furthermore, force acting on the handle when the vehicle lands or the like can be evacuated by the elastic support of the handle post, and a part of the projection is disposed to be overlapped with the axial line of the handle in the axial line direction of the front fork. Therefore, when the position of the handle is displaced downwards to the axial line direction of the front fork due to the elastic support, the handle comes into contact with the projection. Accordingly, external force can be prevented from acting on the air valve through the handle.

The recess portion which is concaved in the opposite direction to the air valve is formed on the projection. Therefore, the working space can be secured by the recess portion, and thus air can be easily supplemented.

The cable is routed in the space between the handle post and the projection. Therefore, when the handle sags downwards, the cable can be prevented from being pinched between the handle and the projection.

DETAILED DESCRIPTION OF THE EMBODIMENT

Figure 1:
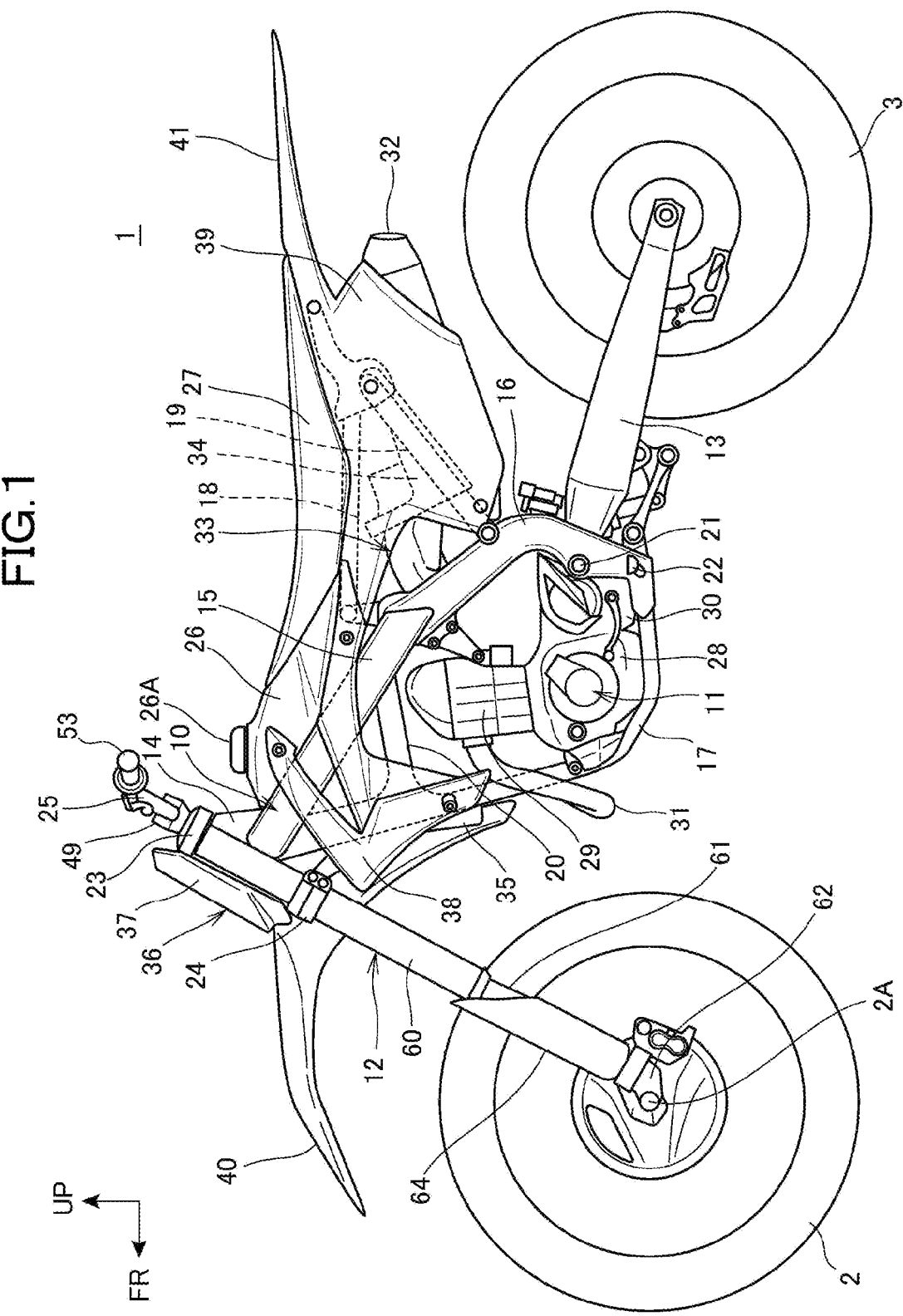
FIG. 1 is a left side view showing a two-wheeled motor vehicle according to an embodiment of the present invention.

A two-wheeled motor vehicle according to an embodiment of the present invention will be described hereunder. In the drawings, an arrow FR represents the front-and-rear direction of a vehicle (two-wheeled motor vehicle), an arrow UP represents the upward direction of the vehicle, and an arrow LE represents the leftward direction of the vehicle. In the following description, these directions are appropriately used.

Figure 2:
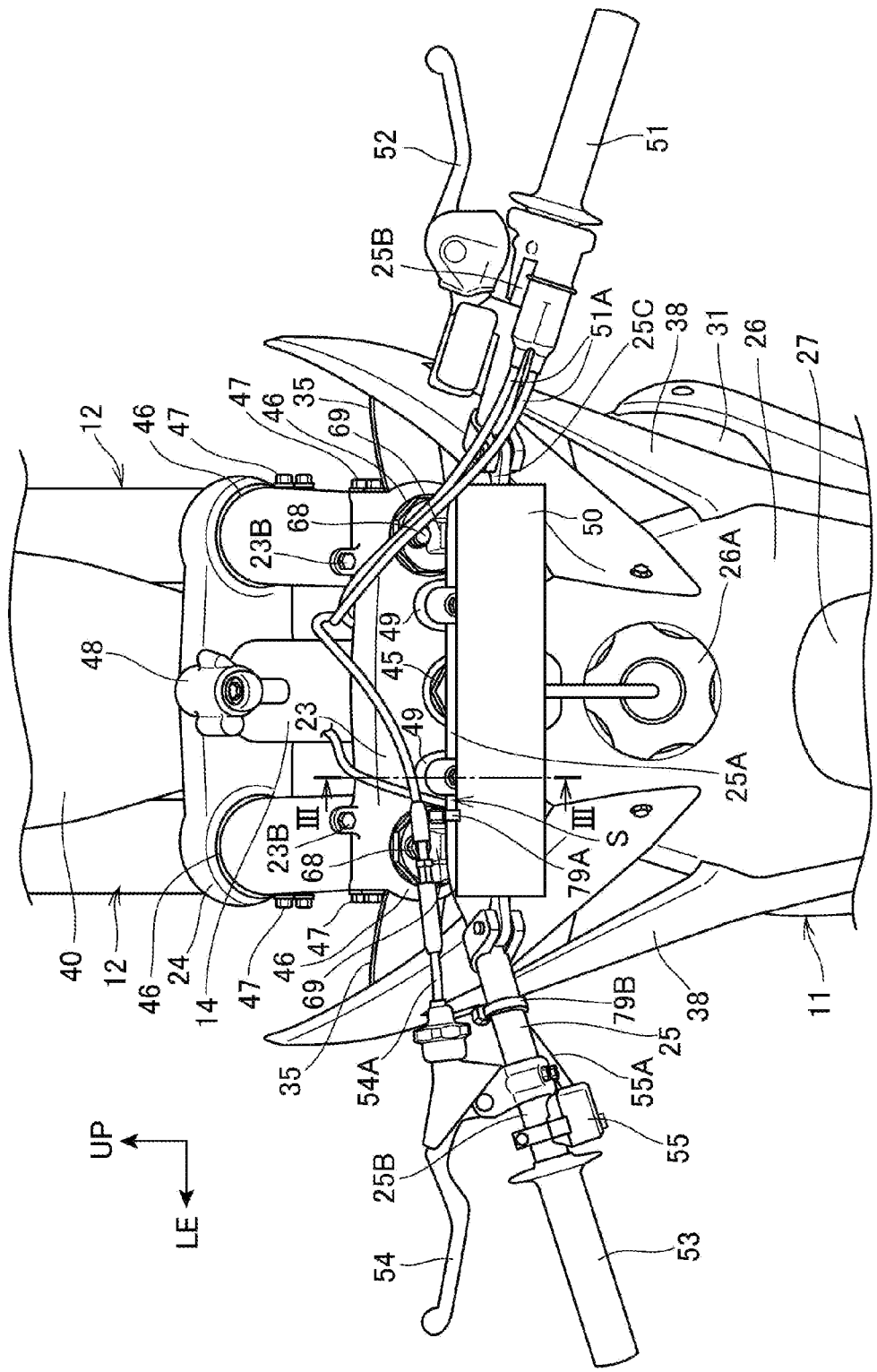
FIG. 2 is a plan view of a front portion of the two-wheeled motor vehicle which is taken from the upper side of the two-wheeled motor vehicle.

FIG. 1 is a left side view showing the two-wheeled motor vehicle according to the embodiment of the present invention, and FIG. 2 is a plan view of the front portion of the two-wheeled motor vehicle when the front portion of two-wheeled motor vehicle is viewed from the upper side thereof.

The two-wheeled motor vehicle 1 is configured as an off-road straddle type vehicle in which an engine 11 is disposed at the center in the front-and-rear direction of a vehicle body frame 10, front forks 12 supporting a front wheel 2 are supported at the front end of the vehicle body frame 10 so as to be steerable, and a swing arm 13 supporting a rear wheel 3 is provided to the lower portion of the rear portion of the vehicle body 10.

The vehicle body 10 comprises a head pipe 14 supporting the pair of right and left front forks 12, a pair of right and left main frames 15 extending rearwards and downwards (i.e., to the rear lower side of the vehicle body) from the head pipe 14, a pair of right and left pivot plates 16 which extend rearwards and downwards from the rear ends of the main frames 15, curve frontwards and downwards (to the front lower side of the vehicle body) and then extend downwards, a down frame 17 which extends rearwards from the head pipe 14, furcates to the right and left sides at the front side of the engine 11, extends at the lower side of the engine 11 and then connects to the lower ends of the pivot plates 16, a pair of right and left seat rails 18 which extend substantially horizontally rearwards from the upper portions of the pivot plates 16, and a pair of right and left rear pipes 19 each of which is bridged between the intermediate portion in the up-and-down (vertical) direction of the pivot plate 16 and the rear portion of the seat rail 18. The down frame 17 and the main frames 15 are joined to each other through a pair of right and left reinforcing pipes 20 extending at the upper side of the engine 11.

The pivot plates 16 are provided with a pivot shaft penetrating through the right and left pivot plates 16 in the vehicle width direction, and the swing arm 13 is pivotally supported by the pivot shaft 21 so as to be swingable. The rear wheel 3 is pivotally supported by the rear end of the swing arm 13. A pair of right and left steps 22 are provided to the lower portions of the pivot plates 16.

A steering shaft (not shown) is pivotally supported by the head pipe 14, and the front forks 12 are joined to a top bridge 23 and a bottom bridge 24 which are joined to the upper and lower ends of the steering shaft. A steering handle 25 (handle) is secured to the top bridge 23.

A fuel tank 26 is disposed between the right and left main frames 15, and a seat 27 on which a drive sits is continuous with the rear portion of the fuel tank 26 and extends downwards while supported by the seat rails 18. A tank cap 26A is provided to the upper portion of the fuel tank 26 so as to block an oil supply port.

The engine 11 is a water-cooling four-cycle type single cylinder engine, and has a crank case 28 in which a crank shaft (not shown) extending in the vehicle width direction is accommodated, and a cylinder 29 which extends upwards while slightly tilted forwards from the front portion of the crank case 28. The engine 11 is supported between each main frame 15 and each down frame 17. A transmission 30 is integrally provided to the rear portion of the crank case 28. An exhaust pipe 31 is connected to the front portion of the cylinder 29, and the exhaust pipe 31 is bent to the right side, extends rearwards and then is connected to a muffler 32 at the rear portion of the vehicle body.

An air intake device for supplying fuel and air to the engine 11 is disposed at the rear side of the cylinder 29. An air cleaner box 34 serving as an outside air intake port of the air intake device 33 is disposed in a space surrounded by the right and left seat rails 18 and the rear pipe 19.

A plate-like radiator 35 extending in the up-and-down direction is provided at the front side of the cylinder 29. The radiator 35 is provided while divided into a pair of parts at the right and left sides of the down frame 17, and fixed to the down frame 17.

The two-wheeled motor vehicle 1 of this embodiment has a body cover 36 formed of resin, and the body cover 36 comprises a front cover 37 covering the front side of the head pipe 14, a pair of right and left shrouds 38 covering the upper portion of the down frame 17 and the sides of the main frames 15, and a pair of right and left side covers 39 covering the air cleaner box 34, the muffler 32, etc. from the sides at the lower side of the seat 27. A front fender 40 is fixed to the bottom bridge 24, and a rear fender 41 is provided at the rear side of the seat 27.

FIG. 2 is a plan view of the two-wheeled motor vehicle which is taken from the upper side. In FIG. 2, the front cover 37 is detached from the two-wheeled motor vehicle.

As shown in FIGS. 1 and 2, the top bridge 23 and the bottom bridge 24 are configured like plates extending in the body width direction, arranged so as to sandwich the head pipe 14 from the upper and lower sides respectively, and joined to the upper end and lower end of the steering shaft.

The upper end of the steering shaft (not shown) is inserted through the center portion in the body width direction of the top bridge 23, and the steering shaft and the top bridge 23 are joined to each other by a lock nut 45 fastened to the upper end of the steering shaft.

Fork support hole portions 46 in which the respective front forks 12 are inserted are formed at both the end portions in the body width direction of the top bridge 23 and the bottom bridge 24, and the front forks 12 are fixed to the top bridge 23 and the bottom bridge 24 by constriction force of bolts 47 which are fastened so as to reduce the diameter of the respective fork support hole portions 46. A pair of stays 23B to which the upper portion of the front cover 37 is fixed are provided to the front surface of the top bridge 23.

A steering damper 48 for damping turning of a steering system which is configured to contain the front forks 12 and the steering shaft is provided to the front portion of the head pipe 14. One end of the steering damper 48 is joined to the front portion of the head pipe 14, and the other end of the steering damper 48 is joined to the bottom bridge 24.

Each of a pair of right and left handle posts 49 projecting upwards from the upper surface of the top bridge 23 is provided between each of the right and left fork support hole portions 46 and the lock nut 45, and the steering handle 25 is supported by the handle posts 49.

The steering handle 25 is configured as a bar-shaped handle which is integrally provided with a handle center portion 25A supported by the handle posts 49 and extension portions 25B extending from the handle center portion 25A to the right and left sides thereof. The steering handle 25 is formed of an iron-based material or aluminum alloy. The base end portions of the right and left extension portions 25B are joined to each other by a reinforcing bar 25C extending in parallel to the handle center portion 25A. A cylindrical pad 50 formed of sponge or the like is secured to the reinforcing bar 25C.

A throttle tube 51 and a front brake lever 52 which are operated by a driver are provided to the end of the extension portion 25B at the right side as shown in FIG. 2. An accelerator cable 51A extending from the throttle tube 51 extends forwards along the front surfaces of the extension portion 25B and the top bridge 23, passes through the gap between the right-side front fork 12 and the head pipe 14, and then is connected to the air intake device 33 side.

A grip 53 to be gripped by the driver, a clutch lever 54 for operating the clutch of the engine 11 and a kill switch 55 are provided at the end of the left-side extension portion 25B. The driver can cut ignition of the engine 11 and stop the engine by operating the kill switch 55. A clutch cable 54A extending from the clutch lever 54 passes over the upper side of the left-side front fork 12, extends to the gap between the right-side front fork 12 and the head pipe 14, and then is connected to the engine 11 side. A cable 55A extending from the kill switch 55 passes through the gap between the left-side front fork 12 and the handle post 49, and is drawn to the front side of the top bridge 23.

Figure 3:
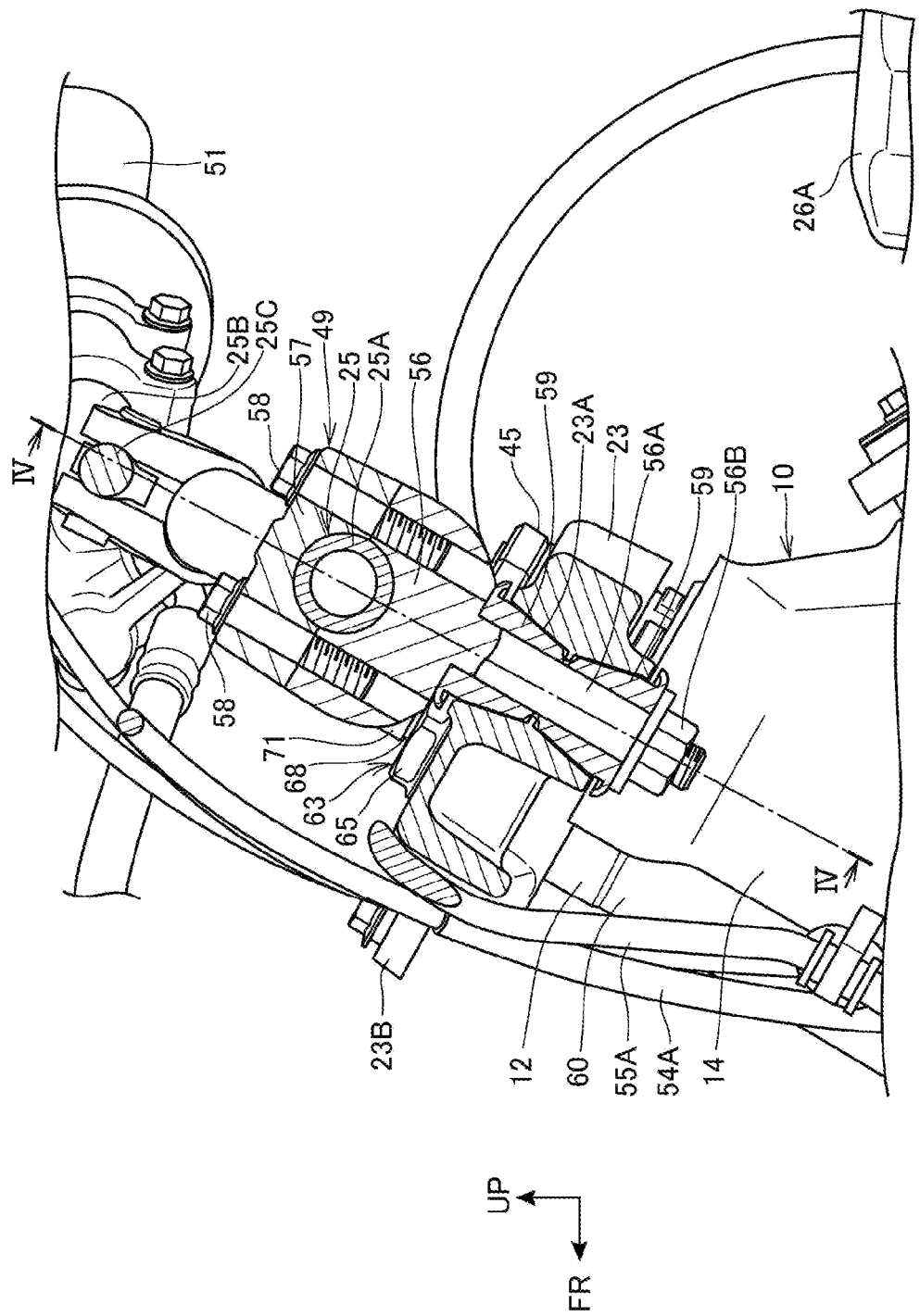
FIG. 3 is a cross-sectional view taken along III-III of FIG. 2.
Figure 4:
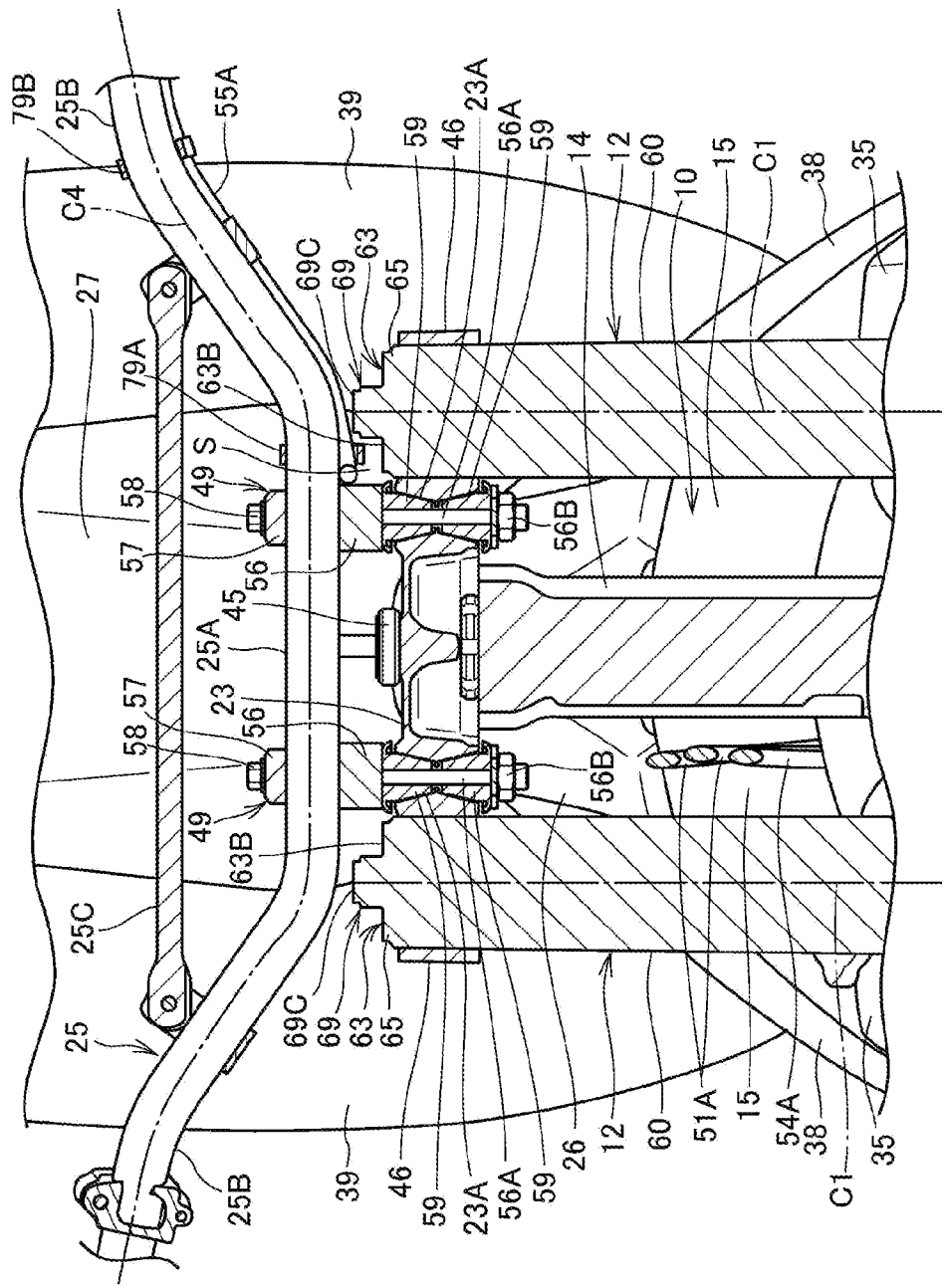
FIG. 4 is a cross-sectional view taken along IV-IV of FIG. 3.

FIG. 3 is a cross-sectional view taken along III-III of FIG. 2, and FIG. 4 is a cross-sectional view taken along IV-IV of FIG. 3. Here, in FIGS. 3 and 4, the front cover 37 and the pad 50 are omitted from the illustration. In FIG. 4, the internal structures of the front fork 12 and the head pipe 4 are omitted from the illustration.

As shown in FIGS. 3 and 4, the handle posts 49 are configured as a split fastening mechanism so as to be vertically split into upper and lower parts and pinch the handle center portion 25A therebetween. Each of the handle post 49 has a base portion 56 for supporting the lower half portion of the pipe-shaped handle center portion 25A having a circular cross-section, and a cap portion 57 for supporting the upper half portion of the handle center portion 25A. Handle post fixing holes 23A penetrating through the top bridge 23 vertically are formed in the top bridge 23.

Figure 5:
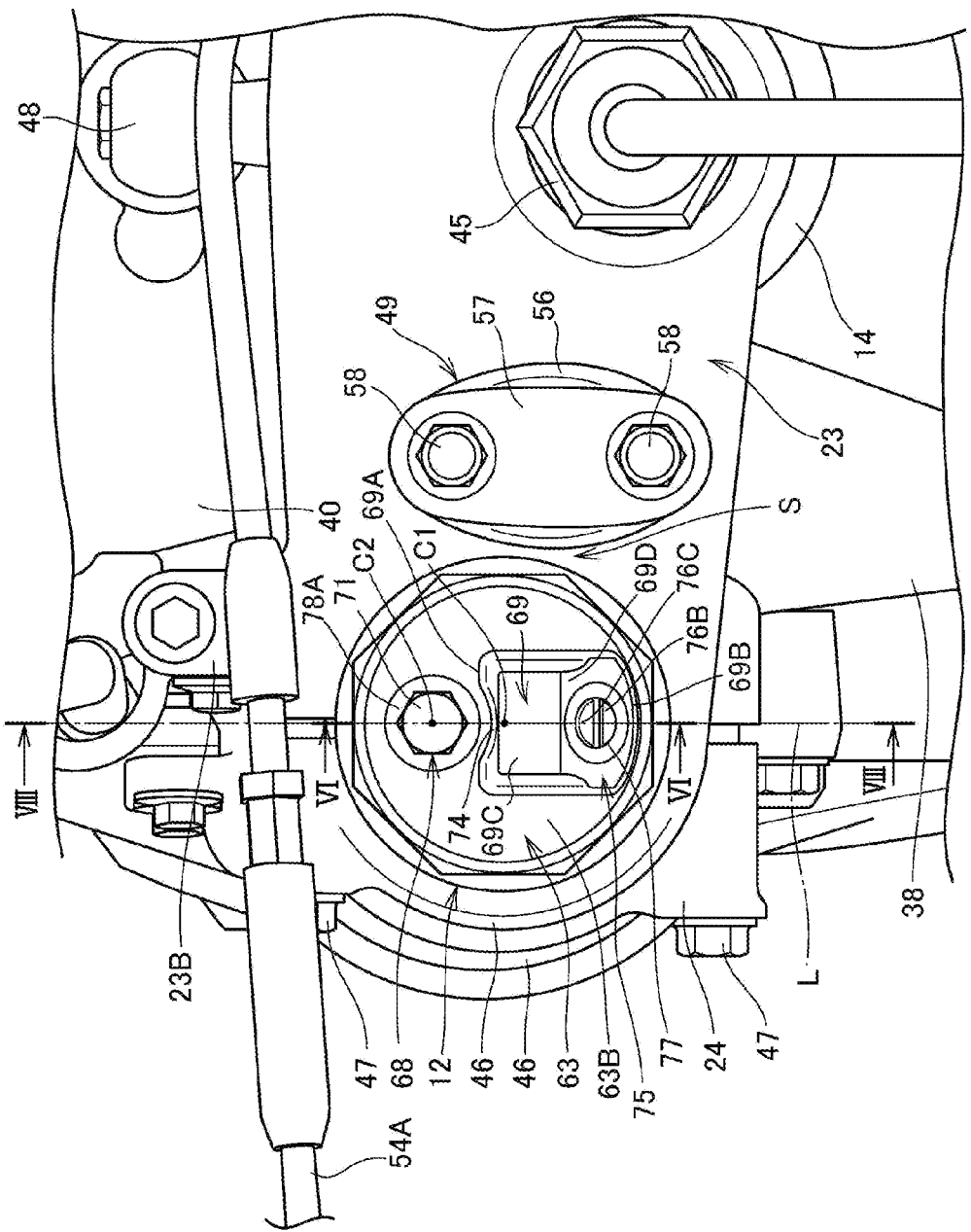
FIG. 5 is a view of a front fork which is taken along an axis line direction of the front fork from the upper side of the front fork.

Each cap portion 57 is fixed to the upper surface of the base portion 56 by a pair of handle fixing bolts 58 which are arranged in the front-and-rear direction so as to straddle the handle center portion 25A as shown in FIG. 5.

The base portion 56 has a shaft portion 56A inserted in the handle post fixing hole 23A. The shaft portion 56A is inserted from the upper side into the handle post fixing hole 23A, and fixed to the top bridge 23 by a nut 56B fastened to the lower end of the shaft portion 56A. The steering handle 25 is supported by the base portions 56 projecting upwards from the top bridge 23, whereby the steering handle 25 is supported while kept upwards away from the upper surface of the top bridge 23.

A cylindrical anti-vibration collar 59 (elastic member) which is provided with a vibration-proofing portion formed of rubber, urethane or the like as the outer peripheral portion thereof is fitted to the outer peripheral portion of the shaft portion 56A of each base portion 56, the base portions 56 are rubber-mounted in the top bridge 23 through the anti-vibration collars 59. That is, in the two-wheeled motor vehicle 1, the steering handle 25 is rubber-mounted on the top bridge 23, thereby moderating vibration transmitted from the steering handle 25 to the driver or an impact from the road surface.

Figure 6:
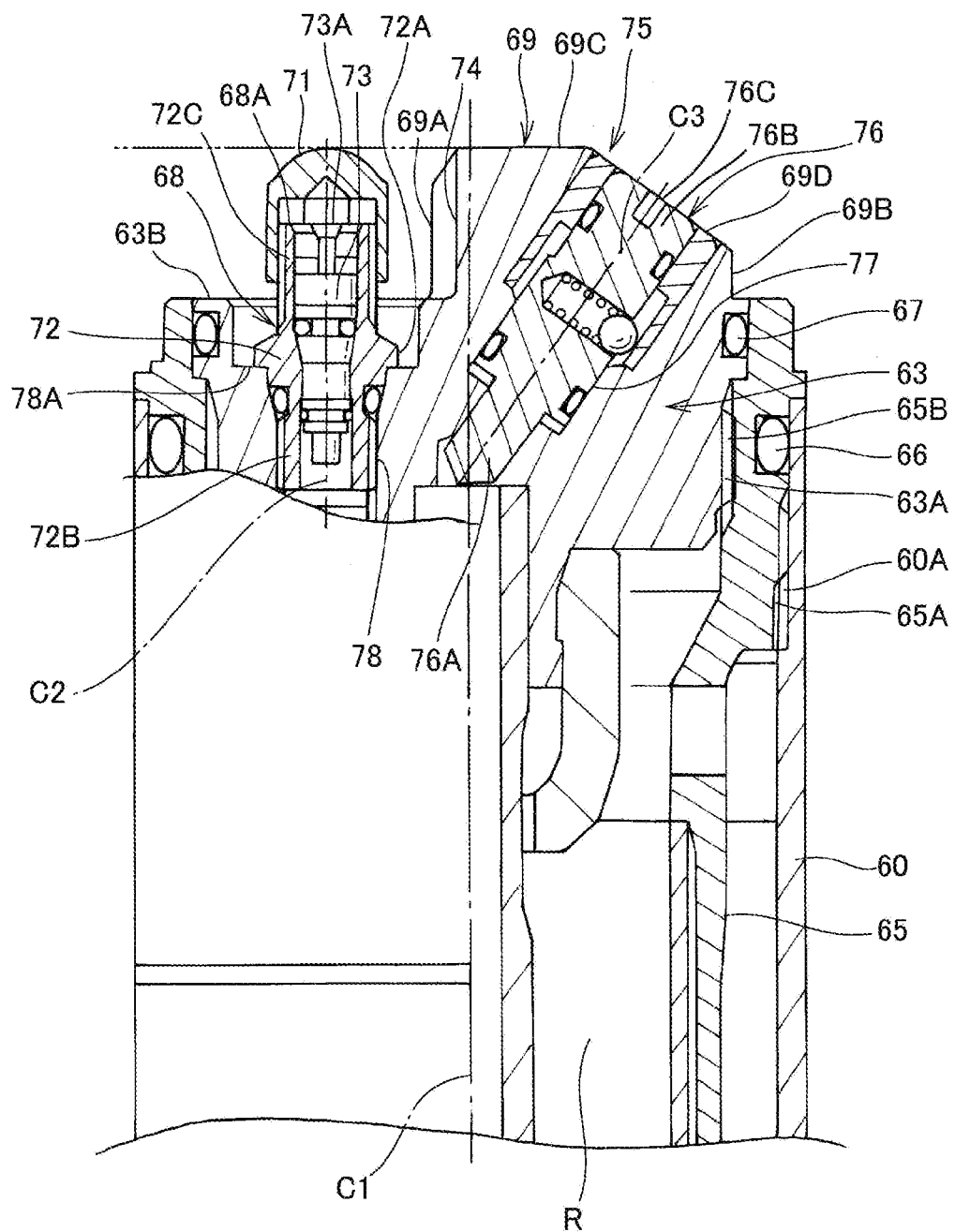
FIG. 6 is a cross-sectional view taken along VI-VI of FIG. 5.

FIG. 5 is a view of the front fork 12 which is taken from the upper side along the axial line direction C1 of the front fork 12. FIG. 6 is a cross-sectional view taken along VI-VI of FIG. 5. Here, FIG. 5 shows a state that the steering handle 25 is detached.

As shown in FIGS. 1, 5 and 6, the front fork 12 is designed as a so-called inverted type front fork having an outer tube 60 provided to the vehicle body side and an inner tube 61 (FIG. 1) which is provided to the front wheel 2 side and freely slidably fitted in the outer tube 60. The inner tube 61 can get into or out of the outer tube 60 while the outer periphery thereof is brought into sliding contact with the inner periphery of the outer tube 60, whereby the front fork 12 can receive vibration of the road surface from the front wheel 2, and expand (elongate) and contract.

The lower end of the front fork 12 is blocked by a bottom member 62 provided to the lower end of the inner tube 61, and the upper end of the front fork 12 is blocked by a cap 63 provided to the upper end of the outer tube 60, whereby the front fork 12 is kept hermetically sealed so that air is sealingly filled therein as described later. The front wheel 2 is pivotally supported on the shaft 2A inserted in the bottom member 62. A cover member 64 which covers the inner tube 61 from the front side is secured to the bottom member 62.

In the front fork 12 is provided a suspension spring (not shown) for urging the front fork 12 in the expansion direction and a damper mechanism (not shown) for damping the expansion/contraction motion of the front fork 12 by fluid resistance of fork oil stocked in the front fork 12. An air chamber R (FIG. 6) in which air can be filled is formed at the lower side of the cap 63 and at the upper side of the oil surface of the fork oil.

The suspension spring is provided while the upper end thereof is pressed by a cylindrical spacer 65, whereby an initial load is applied to the suspension spring. The cylindrical spacer 65 has a spring portion 65A on the outer periphery of the upper end portion thereof, and the spring portion 65A is threadably fitted (screwed) to a screw portion 60A of the inner peripheral portion at the upper end of the outer tube 60, whereby the cylindrical spacer 65 is integrally fixed to the outer tube 60. The gap between the cylindrical spacer 65 and the outer tube 60 is hermetically sealed by a ring-shaped seal member 66.

The cap 63 is designed in a disc shape, and has a screw portion 63A on the outer peripheral surface thereof. The screw portion 63A is threadably fitted to the screw portion 65B formed on the inner peripheral surface of the upper end portion of the cylindrical spacer 65, whereby the cap 63 is fixed to the upper end of the outer tube 60 to block the opening at the upper end of the outer tube 60. The gap between the cap 63 and the cylindrical spacer 65 is hermetically sealed by a ring-shaped seal member 67. The upper surface of the front fork 12 is constructed by the upper surface 63B of the cap 63 (the upper surface of the front fork).

As shown in FIGS. 5 and 6, an air valve 68 for hermetically (sealingly) filling air in the air chamber R of the front fork 12 and a projection 69 protruding upwards from the upper surface 63B are provided to the upper surface 63B of the cap 63. An air valve cap 71 which covers the air valve 68 from the upper side is secured to the air valve 68. Here, the air valve 68 is formed of metal, and the air valve cap 71 is formed of resin.

The air valve 68 has a cylindrical housing 72 fixed to the upper surface 63B, and a valve core 73 which is threadably fitted to the inner peripheral surface of the housing 72 and opens/closes an air passage in the housing 72. The housing 72 has a flange portion 72A projecting outwards in the radiation direction at the intermediate portion thereof in the axial direction, a fixing screw portion 72B threadably fitted to the cap 63 at the lower side of the flange portion 72A and a cap screw portion 72C threadably fitted to the air valve cap 71 at the upper side of the flange portion 72A. A pin portion 73A at the upper end of the valve core 73 is pressed to open the air passage and allow air flow through the air valve 68. By adjusting the air pressure in the air chamber R through the air valve 68, a desired spring force based on air spring can be obtained, and the characteristic of the front fork 12 can be adjusted to a desired characteristic.

The cap 63 has a valve fixing hole 78 penetrating through the cap 63 in the axial direction, and a counterbore 78A formed on the upper surface 63B coaxially with the valve fixing hole 78. The air valve 68 is fixed to the cap 63 by threadably fitting the fixing screw portion 72B to the valve fixing hole 78 and fastening the fixing screw portion 72B until the flange portion 72A comes into contact with the bottom surface of the counterbore 78A as shown in FIG. 6. The valve fixing hole 78 is formed in parallel to the axial line C1 of the front fork 12, and the air valve 68 is fixed under the state that the axial line C2 thereof is parallel to the axial line C1 of the front fork 12.

The cap screw portion 72C and the air valve cap 71 project to the upper side of the upper surface 63B under the state that they are fixed to the cap 63.

As shown in FIG. 5, when viewed from the direction of the axial line C1, the air valve 68 is disposed so that the axial line C2 is overlapped with the center line L in the vehicle width direction of the front fork 12, and disposed to be shifted to the outer peripheral side in front of the axial line C1 of the front fork 12.

The projection 69 is a block-shaped projection, and it is formed in a substantially rectangular shape when viewed from the upper side in the direction of the axial line C1 as shown in FIG. 5. The projection 69 is disposed behind the air valve 68, the front surface 69A of the projection 69 (a surface of the projection 69 which confronts the air valve 68) is formed to be nearer to the air valve 68 side than the axial line C1, and the rear surface 69B of the projection 69 is formed in proximity to the outer periphery of the cap 63. The center in the vehicle width direction of the projection 69 is substantially coincident with the center line L in the vehicle width direction of the front fork 12, and the width and the length in the front-and-rear direction of the projection 69 are longer than the diameter of the air valve 68. The front surface 69A of the projection 69 confronts the air valve 68, and a concave (recess) portion 74 which is concaved (recessed) arcuately in the opposite direction to the air valve 68 side is formed on the front surface 69A.

An adjuster 76 of a damping force adjusting mechanism 75 capable of adjusting the damping force of the damper mechanism is provided in the projection 69. By rotating the adjuster 76, a push rod (not shown) of the damping force adjusting mechanism 75 is moved to change the opening area of a valve (not shown), thereby enabling the adjustment of the damping force. The adjuster 76 is formed in a cylindrical shape, and has a small-diameter tip portion 76A connected to the push rod, and a rotational shaft portion 76B which is rotatably supported in an adjuster support hole 77 formed in the cap 63. A tool groove 76C in which a tool for rotating the rotational shaft portion 76B is formed on the upper end of the rotational shaft portion 76B.

The adjuster support hole 77 of the cap 63 is formed to be obliquely inclined so that the axial line C3 thereof intersects to the axial line C1 of the front fork 12 from the upper side, and the adjuster 76 inserted in the adjuster support hole 77 is likewise disposed to be inclined. A flat surface 69C orthogonal to the axial line C1 and a slope surface 69D descending from the flat surface 69C to the rear surface 69B at the outer peripheral side of the front fork 12 are formed on the upper surface of the projection 69. The adjuster support hole 77 is formed vertically to the slope surface 69D, and extends obliquely downwards to the axial line C1 side at the center of the front fork 12. As described above, the projection 69 is formed on the upper surface 63B of the cap 63, and the adjuster support hole 77 is formed in the slope surface 69D of the upper surface of the projection 69. Therefore, the adjuster 76 can be disposed to be sloped to the axial line C1 side of the front fork 12.

The height of the flat surface 69C of the projection 69 is set to be higher than the height of the valve upper surface 68A of the upper surface of the air valve 68 in the direction of the axial line C1. Furthermore, under the state that the air valve cap 71 is secured to the air valve 68 while it is fastened until the last, the heights of the air valve cap 71 and flat surface 69C are substantially equal to each other.

Figure 7:
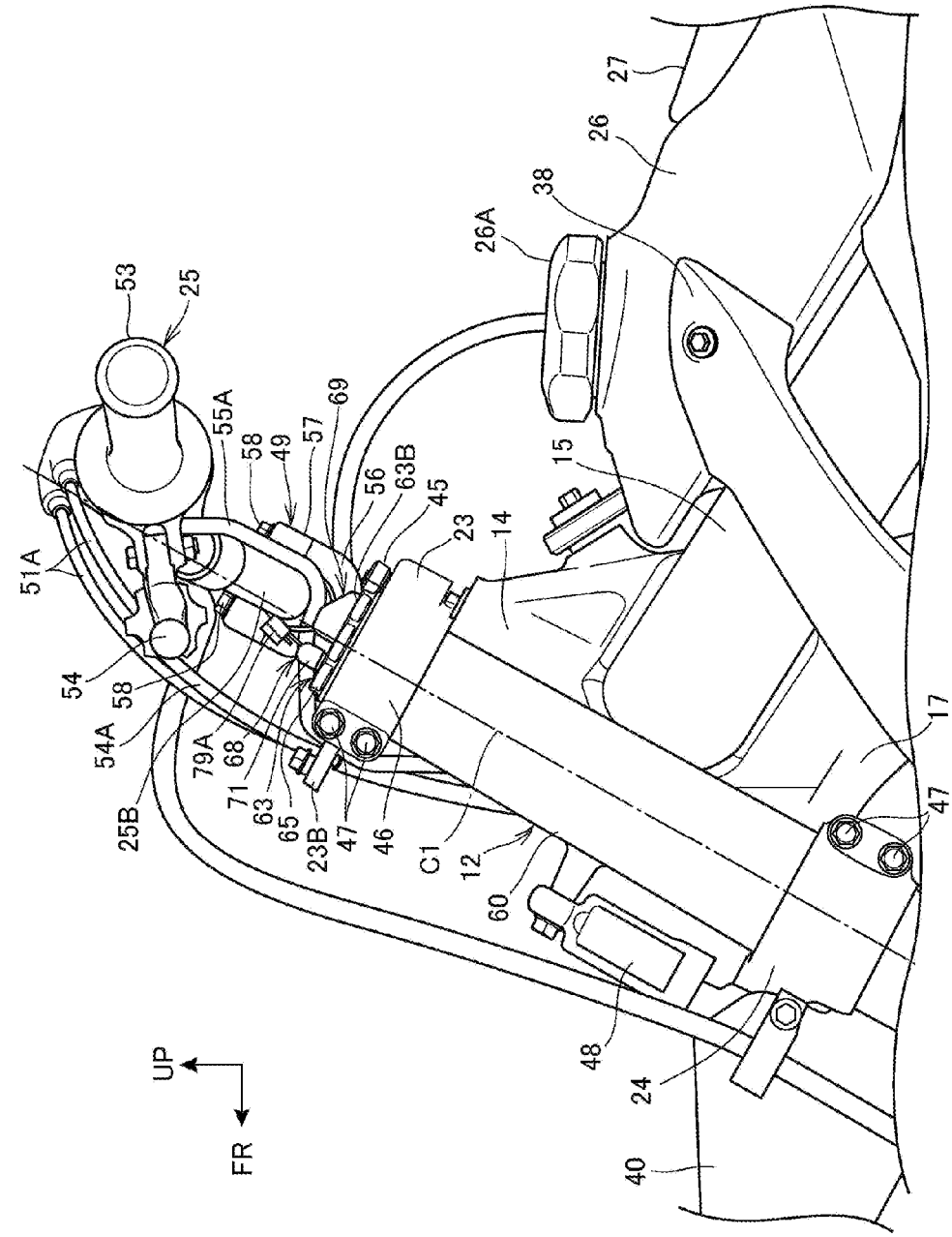
FIG. 7 is a left side view showing the circumference of the upper portion of the front fork.
Figure 8:
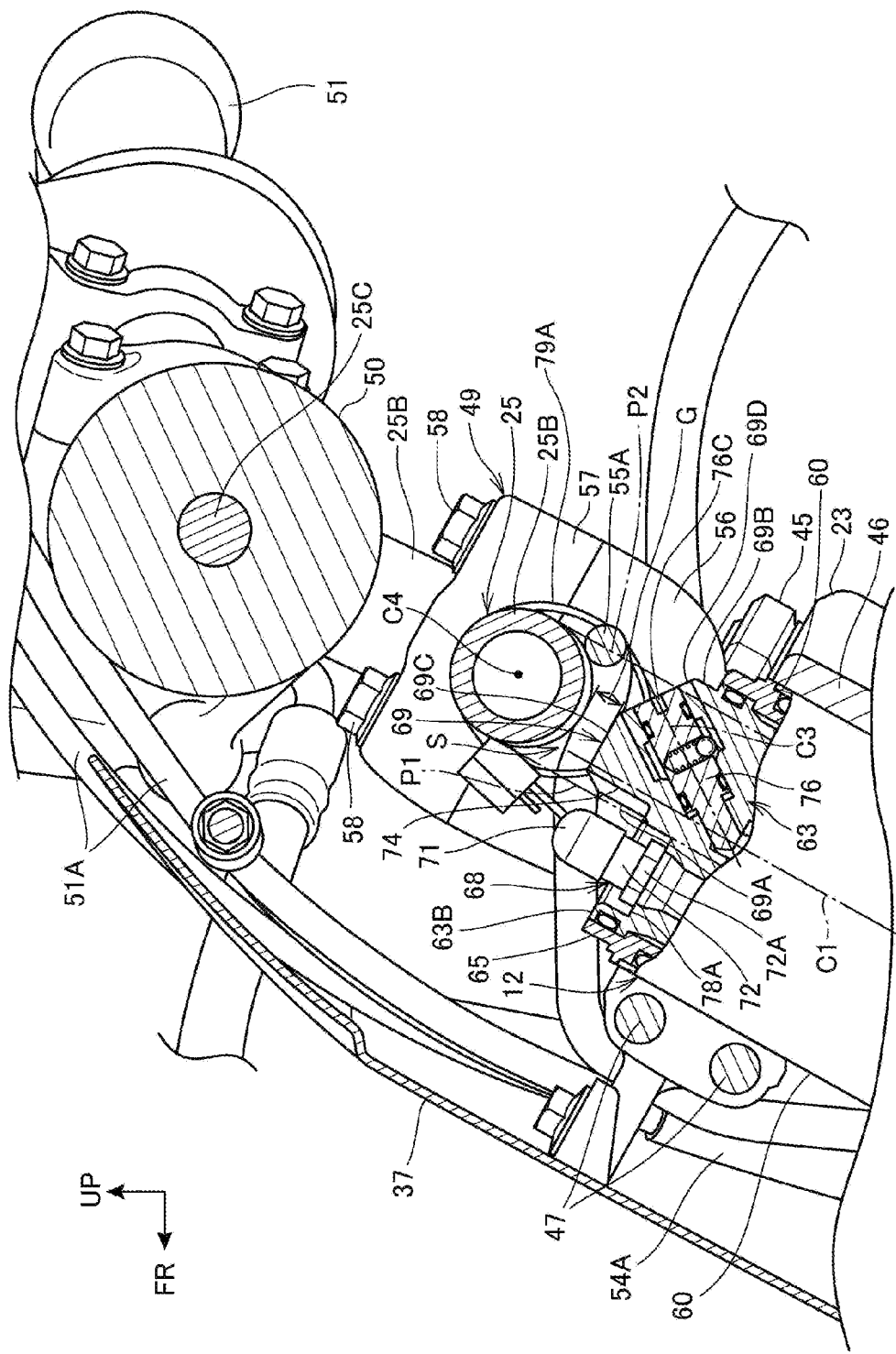
FIG. 8 is a cross-sectional view taken along VIII-VIII of FIG. 5.

FIG. 7 is a left side view showing the neighborhood of the upper portion of the front fork 12. FIG. 8 is a cross-sectional view taken along VIII-VIII of FIG. 5.

As shown in FIGS. 7 and 8, the front fork 12 is supported by the top bridge 23 and the bottom bridge 24 under the state that the axial line C1 is backwards tilted by the amount corresponding to the caster angle of the two-wheeled motor vehicle. The front fork 12 is supported at the lower side of the extension portion 25B of the steering handle 25 under the state that the upper surface 63B of the cap 63 protrudes to the upper side of the upper surface of the fork support hole portion 46 of the top bridge 23. That is, the projection 69 of the cap 63 and the air valve 68 are disposed between the extension portion 25B and the top bridge 23.

The protrusion amount of the upper surface 63B of the front fork 12 from the top bridge 23 can be adjusted in accordance with user's taste by changing the position of the front fork 12 in the up-and-down direction and fixing the front fork 12 at that changed position so that a gap G can be secured between the flat surface 69C and the lower surface of the extension portion 25B and the projection 69 does not come into contact with the steering handle 25.

The front fork 12 is disposed to be offset to the front side of the steering handle 25, and the axial line C1 of the front fork 12 is located in front of a handle axial line C4 (FIG. 8) above the projection 69. The handle axial line C4 passes through the center of the steering handle 25 having a circular cross-section, and extends in the axial direction of the steering handle 25.

In FIG. 8, a front end line P1 and a rear end line P2 of a projection plane (containing a hatched ring-shaped cross-section in FIG. 8) obtained by projecting the extension portion 25B above the projection 69 in the extension direction of the axial line C1 of the front fork are represented by two-dotted chain lines. When viewed in the extension direction of the axial line C1, the front surface 69A of the projection 69 is substantially coincident with the front end line P1 of the projection plane, and the rear surface 69B of the projection 69 is located at the rear side of the rear end line P2 of the projection plane as shown in FIG. 8. The projection 69 is located to be overlapped with the substantially whole extension portion 25B containing the handle axial line C4 with respect to the direction of the axial line C1 as shown in FIG. 8.

The air valve 68 is located in front of the front end line P1 of the projection plane, that is, disposed at the outside of the projection plane of the extension portion 25B with respect to the direction of the axial line C1 of the front fork 12 as shown in FIG. 8.

When a large load is applied to the front fork 12 because the two-wheeled motor vehicle 1 jumps and lands during running or the like, the load also acts on the steering handle 25. That is, external force acts on the extension portions 25B with the handle posts 49 as fulcrum points to make the extension portions 25B sag in the direction of the axial line C1 of the front forks 12, so that the extension portions 25B sag to the flat surface 69C side in such a direction as to reduce the gap G.

In this embodiment, the projection 69 overlapped with the extension portion 25B in the direction of the axial line C1 of the front fork 12 is provided to the upper surface 63B of the cap 63 below the extension portion 25B. Therefore, when each extension portion 25B sags downwards, the extension portion 25B comes into contact with the flat surface 69C of the projection 69. Therefore, the extension portion 25B can be prevented from coming into contact with the air valve cap 71. Furthermore, since the projection 69 is formed at substantially the same height as the air valve cap 71, the extension portion 25B can be received by the projection 69 even when the extension portion 25B sags to the air valve cap 71 side. Therefore, the extension portion 25B can be prevented from coming into direct contact with the air valve cap 71.

Furthermore, when the air valve cap 71 is detached, the height of the valve upper surface 68A of the air valve 68 is lower than the flat surface 69C of the projection 69. Therefore, under the state that the air valve cap 71 is detached (demounted), the extension portion 25B can be prevented from coming into contact with the air valve 68 even when the extension portion 25B sags downwards.

Furthermore, the air valve 68 is disposed at the outside of the projection plane in the direction of the axial line C1 of the extension portion 25B, and is away from the extension portion 25B. Therefore, even when the extension portion 25B sags downwards in the direction of the axial line C1, the extension portion 25B can be prevented from coming into contact with the air valve 68.

When air is filled in the front fork 12 through the air valve 68, the air valve cap 71 is detached, and the connection port of an air filling pump (not shown) is connected to the air valve 68 from the upper side. In this case, the concave (recess) portion 74 is provided to the front surface 69A of the projection 69, and thus the air valve cap 71 can be attached and detached (mounted and demounted) by using the space of the concave portion 74, so that workability is enhanced. A large gap is secured between the air valve 68 and the projection 69 by the concave portion 74. Therefore, the gap can be prevented from being clogged with soil or the like, and a labor to remove soil or the like can be reduced.

Furthermore, the projection 69 is disposed only behind the air valve 69, and there exists no projecting object surrounding the air valve 68. Therefore, the gap between the projection 69 and the air valve 68 can be prevented from being clogged with soil or the like, and a working space can be secured around the air valve 69. Therefore, the connection port of the air filling pump or the like can be easily attached/detached to/from the air valve 68, so that the workability is enhanced. The air valve 68 is disposed at the outside of the projection plane in the direction of the axial line C1 of the extension portion 25B, and the extension portion 25B does not obstruct the connection port of the air filling pump, so that the workability is enhanced.

The adjuster 76 of the damping force adjusting mechanism 75 is disposed to be backwards tilted with respect to the axial line C1 of the front fork 12, and the extension line of the axial line C3 of the adjuster support hole 77 is not overlapped with the extension portion 25B above the adjuster 76. Therefore, the extension portion 25B does not obstruct a tool for adjusting the adjuster 76, so that the workability is enhanced. That is, when the adjuster 76 is adjusted, a tool such as a flat-blade screwdriver or the like can be put into a tool groove 76C along the direction of the axial line C3 to rotate the adjuster 76, and the damping force can be easily adjusted.

Furthermore, the steering handle 25 is rubber-mounted on the top bridge 23 through the anti-vibration collar 59, and thus it can sag more easily by the amount corresponding to sagging of the anti-vibration collar 59 as compared with a rigid-mount construction. However, according to this embodiment, since the projection 69 is provided, the extension portion 68 25B sagging downwards can be prevented from coming into contact with the air valve 68.

As shown in FIGS. 4 and 8, the cable 55A of the kill switch 55 is routed (laid) along the rear surface of the extension portion 25B so as to extend to a neighborhood of the left-side handle post 49, passed through the space S between the handle post 49 and the projection 69 and led to the front side of the top bridge 23. The cable 55A is fixed to the extension portion 25B by a fixing band 79A wound around the extension portion 25B at the upper portion of the space S and a fixing band 79B wound around the extension portion 25B in the neighborhood of the clutch lever 54. Specifically, the cable 55A is positionally regulated by the fixing band 79A, and routed in the space S along the outer surface of the handle post 49. As described above, the cable 55A is passed in the space S located at the inner side in the vehicle width direction of the flat surface 69C of the projection 69, so that the cable 55A can be prevented from being pinched between the extension portion 25B and the flat surface 69C.

As described above, according to the embodiment to which the present invention is applied, the steering handle 25 is provided at the outside of the front fork 12 in the direction of the axial line C1 of the front fork 12, and the air valve 68 for sealingly filling air in the front fork 12 and the projection 69 are provided on the upper surface 63B of the front fork 12. The projection 69 is formed to be higher than the valve upper surface 68A of the air valve 68, and when the extension portion 25B of the steering handle 25 sags downwards, the extension portion 25B preferentially comes into contact with the projection 69 and thus hardly comes into contact with the air valve 68. Therefore, external force can be prevented from acting on the air valve 68 through the steering handle 25. Furthermore, soil or the like hardly deposits in the gap between the projection 69 of the upper surface 63B of the front fork 12 and the air valve 68, and a working space can be secured around the air valve 68, so that air can be easily supplemented.

The height of the flat surface 69C of the projection 69 is set to be substantially equal to the height of the air valve cap 71. Therefore, when the extension portion 25B sags downwards, the extension portion 25B can be prevented from coming into direct contact with the air valve cap 71, and external force can be suppressed from acting on the air valve 6 through the steering handle 25. Furthermore, the projection 69 of the upper surface 63B of the front fork 12 hardly obstructs the work, the working space can be secured around the air valve 68, and the air valve cap 71 can be easily mounted and demounted, so that air can be easily supplemented.

Furthermore, the air valve 68 is disposed at the outside of the projection plane obtained by projecting the extension portion 25B of the steering handle 25 in the direction of the axial line C1 of the front fork 12, so that the extension portion 25B does not intervene, the working space can be secured above the air valve 68, and air can be easily supplemented. Furthermore, the extension portion 25B of the steering handle 25 can be prevented from coming into contact with the air valve 68.

Furthermore, the handle post 49 is elastically supported through the anti-vibration collar 59, whereby force acting when the vehicle lands or the like can be evacuated. A part of the projection 69 is disposed to be overlapped with the handle axial line C4 of the steering handle 25 in the direction of the axial line C1 of the front fork 12. Therefore, even when the position of the extension portion 25B of the steering handle 25 is displaced downwards in the direction of the axial line C1 of the front fork 12 due to elastic support, the extension portion 25B comes into contact with the projection 69. Therefore, external force can be prevented from acting on the air valve 68 through the steering handle 25.

The projection 69 and the air valve 68 are arranged side by side, and the concave portion 74 which is concaved in the opposite direction to the air valve 68 is formed on the front surface 69A confronting the air valve 68 of the projection 69. Therefore, the working space can be secured by the concave portion 74, and air can be easily supplemented.

Furthermore, the cable 55A which is inserted and passed in the front-and-rear direction is routed in the space S extending in the vehicle width direction between the handle post 49 and the projection 69. Therefore, when the extension portion 25B sags downwards, the cable 55A can be prevented from being pinched between the extension portion 25B and the projection 69.

The present invention is not limited to the foregoing embodiment, and various modifications may be made without departing from the subject matter of the present invention.

In the above embodiment, the height of the flat surface 69C of the projection 69 is set to be substantially equal to the height of the air valve cap 71. However, the present invention is not limited to this style. For example, the flat surface 69C of the projection 69 may be set to be higher than the air valve cap 71. According to this construction, the extension portion 25 can be prevented from coming into contact with the air valve cap 71.

Furthermore, in the above embodiment, the description on the inverted type front fork 12 has been made. However, the present invention is not limited to this style. For example, the present invention may be applied to a so-called upright type front fork which has an inner tube at the vehicle body side and has an outer tube at the front wheel 2 side.

Furthermore, in this embodiment, the cap 63 is threadably fitted to the inner peripheral surface of the upper end portion of the cylindrical spacer 65. However, the present invention is not limited to this style. For example, the cap 63 may be directly threadably fitted to a screw portion formed on the inner peripheral surface of the upper end of the outer tube 60.

Furthermore, in the above embodiment, the adjuster 76 is provided in the projection 69. However, the present invention is not limited to this style, and only the projection 69 may be provided without providing the adjuster 76 in the projection 69.

What is claimed is:

1. A two-wheeled motor vehicle having a pair of right and left front forks for rotatably supporting a front wheel, a top bridge for supporting upper ends of the pair of right and left front forks, a handle post provided to the top bridge, and a bar-shaped handle secured to the handle post, wherein the handle is provided above the front forks with respect to an axial line direction of the front forks, each front fork is provided with an air valve for sealingly filling air in the front fork and a projection on the upper surface thereof, and the projection is disposed to be higher than the air valve, wherein the air valve is provided with an air valve cap for supporting the air valve from the upper side thereof, and the height of the projection is set to be substantially equal to the height of the air valve cap or higher than the air valve cap, and wherein the handle post is supported through an elastic member by the top bridge, and a part of the projection is disposed to be overlapped with an axial line of the handle in the axial line direction of the front fork.

2. The two-wheeled motor vehicle according to claim 1, wherein the air valve is disposed at the outside of a projection plane obtained by projecting the handle in the axial line direction of the front fork.

3. The two-wheeled motor vehicle according to claim 1, wherein a cable to be inserted and passed in a front-and-rear direction is routed in a space extending in a vehicle width direction between the handle post and the projection.

4. A two-wheeled motor vehicle having a pair of right and left front forks for rotatably supporting a front wheel, a top bridge for supporting upper ends of the pair of right and left front forks, a handle post provided to the top bridge, and a bar-shaped handle secured to the handle post, wherein the handle is provided above the front forks with respect to an axial line direction of the front forks, each front fork is provided with an air valve for sealingly filling air in the front fork and a projection on the upper surface thereof, and the projection is disposed to be higher than the air valve, wherein the air valve is provided with an air valve cap for supporting the air valve from the upper side thereof, and the height of the projection is set to be substantially equal to the height of the air valve cap or higher than the air valve cap, and wherein the projection and the air valve are arranged side by side, and wherein the air valve is disposed at the outside of a projection plane obtained by projecting the handle in the axial line direction of the front fork.

5. The two-wheeled motor vehicle according to claim 4, wherein a recess portion which is concaved in the opposite direction to the air valve is formed on a surface of the projection which confronts the air valve.

6. A front fork that supports a front wheel of a two-wheeled motor vehicle in which a bar-shaped handle is secured to a top bridge through a handle post and is supported at the upper end thereof by the top bridge, wherein the front fork is provided so that the handle is located above the front fork in an axial line direction of the front fork, an air valve for sealingly filling air in the front fork and a projection are provided on an upper surface of the front fork, and the projection is disposed to be higher than the air valve, wherein the projection and the air valve are arranged side by side, and wherein a recess portion which is concaved in the opposite direction to the air valve is formed on a surface of the projection which confronts the air valve.

* * * * *